US007260306B2

(12) United States Patent
Murata et al.

(10) Patent No.: US 7,260,306 B2
(45) Date of Patent: Aug. 21, 2007

(54) EDITING METHOD FOR RECORDED INFORMATION

(75) Inventors: Shigeyuki Murata, Kodaira (JP); Makoto Kutsuwada, Hachioji (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 1610 days.

(21) Appl. No.: 09/956,141

(22) Filed: Sep. 20, 2001

(65) Prior Publication Data

US 2002/0028060 A1 Mar. 7, 2002

Related U.S. Application Data

(63) Continuation-in-part of application No. 08/867,192, filed on Jun. 2, 1997.

(30) Foreign Application Priority Data

Jun. 4, 1996 (JP) .................................. 8-141921

(51) Int. Cl.
*H04N 5/91* (2006.01)

(52) U.S. Cl. .......................... 386/46; 386/52; 348/722

(58) Field of Classification Search .................... 386/4, 386/46, 52, 54; 348/722, 907; 360/13; 369/83; 715/723

See application file for complete search history.

(56) References Cited

U.S. PATENT DOCUMENTS 4,393,415 A 7/1983 Hurst
4,602,297 A * 7/1986 Reese .......................... 386/52
4,724,491 A 2/1988 Lambert
5,227,892 A * 7/1993 Lince .......................... 386/54
5,333,091 A * 7/1994 Iggulden et al. .............. 386/55
5,467,288 A * 11/1995 Fasciano et al. ............ 715/723
5,541,738 A 7/1996 Mankovitz

FOREIGN PATENT DOCUMENTS

JP 4228167 8/1992
JP 05290549 5/1993
JP 5290549 11/1993

* cited by examiner

*Primary Examiner*—James J. Groody
*Assistant Examiner*—Christopher Onuaku
(74) *Attorney, Agent, or Firm*—Mattingly, Stanger, Malur & Brundidge, P.C.

(57) ABSTRACT

A method, apparatus and computer program for editing recorded information having a format where both a video signal and an audio signal are recorded on a recording medium. When the recorded information is reproduced, a detection is conducted to determine a position where a predetermined condition is produced in the audio signal. Discriminating information indicative of an editing position is produced based on the position where the predetermined condition is detected and displayed on a screen of a display apparatus.

15 Claims, 12 Drawing Sheets

200

START 201
(FIG. 1) 100
INPUT INFORMATION OF DETECTED PAIR OF SUBJECT POINTS 202
JUDGE THAT A PAIR OF SUBJECT POINTS IS LOCATED IN A PREDETERMINED RANGE 203
IS THE POINT LOCATED IN A PREDETERMINED RANGE? 204 (Y / N)
SELECT A PAIR OF CM INSERTION SUBJECT POINTS, AND STORE INFORMATION THEREOF 205
IS INFORMATION ABOUT NEXT SUBJECT POINTS PAIR LOADED? 206 (Y / N)
END 207

IN
OUT
TIME
1 ROLL LENGTH
ENTIRE ROLL LENGTH
END
30' 00"
00' 00"
30
31
32
33
34
35
36
37
38
39
40
42
43
44

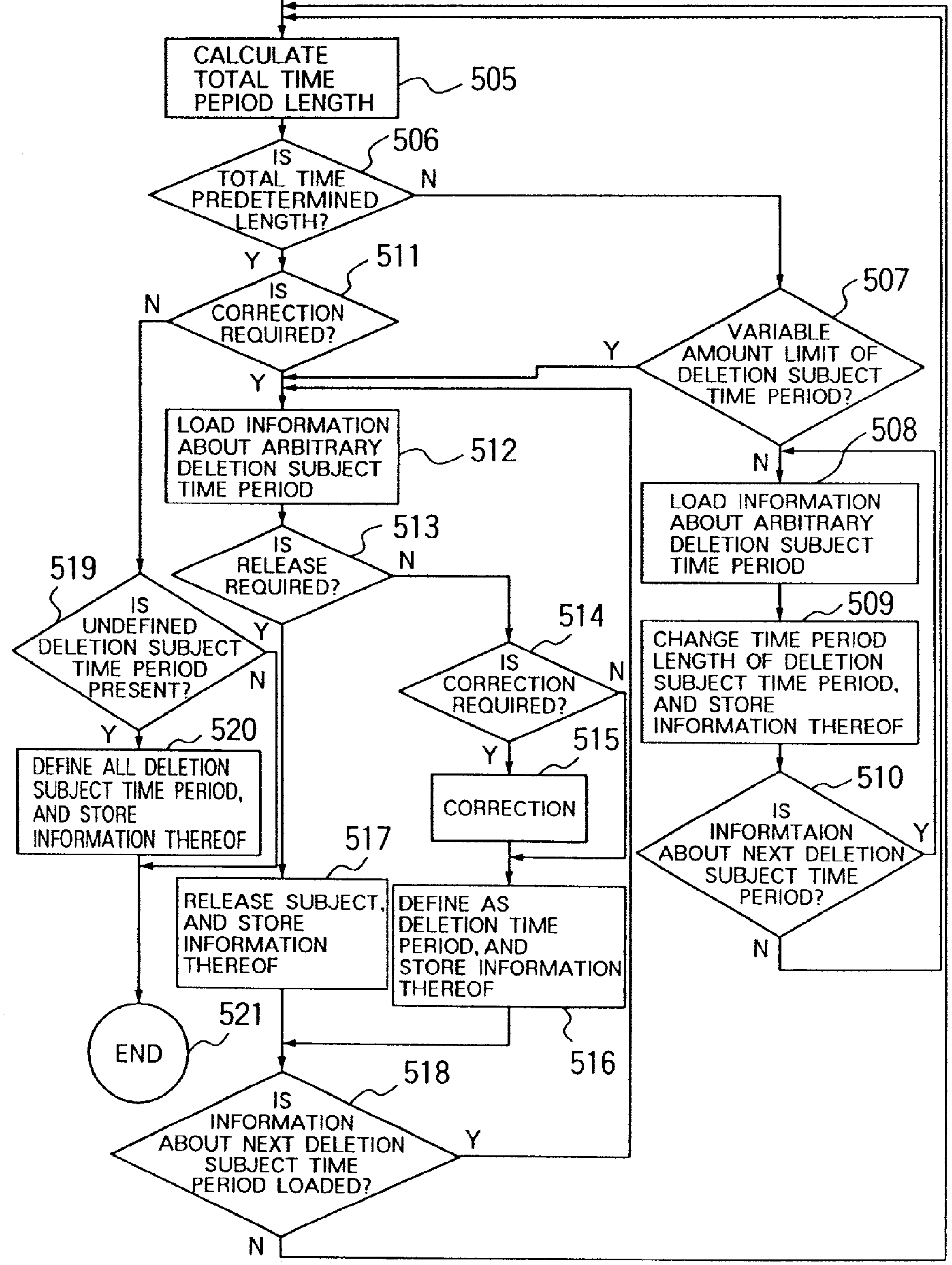

FIG. 7B
(FIG. 7A)
A
CALCULATE TOTAL TIME PEPIOD LENGTH
505
506
IS TOTAL TIME PREDETERMINED LENGTH?
N
Y
511
IS CORRECTION REQUIRED?
N
Y
507
VARIABLE AMOUNT LIMIT OF DELETION SUBJECT TIME PERIOD?
Y
N
508
LOAD INFORMATION ABOUT ARBITRARY DELETION SUBJECT TIME PERIOD
512
513
IS RELEASE REQUIRED?
N
Y
LOAD INFORMATION ABOUT ARBITRARY DELETION SUBJECT TIME PERIOD
509
CHANGE TIME PERIOD LENGTH OF DELETION SUBJECT TIME PERIOD, AND STORE INFORMATION THEREOF
519
IS UNDEFINED DELETION SUBJECT TIME PERIOD PRESENT?
Y
N
514
IS CORRECTION REQUIRED?
N
Y
515
CORRECTION
520
DEFINE ALL DELETION SUBJECT TIME PERIOD, AND STORE INFORMATION THEREOF
510
IS INFORMTAION ABOUT NEXT DELETION SUBJECT TIME PERIOD?
Y
N
517
RELEASE SUBJECT, AND STORE INFORMATION THEREOF
DEFINE AS DELETION TIME PERIOD, AND STORE INFORMATION THEREOF
516
521
END
518
IS INFORMATION ABOUT NEXT DELETION SUBJECT TIME PERIOD LOADED?
Y
N

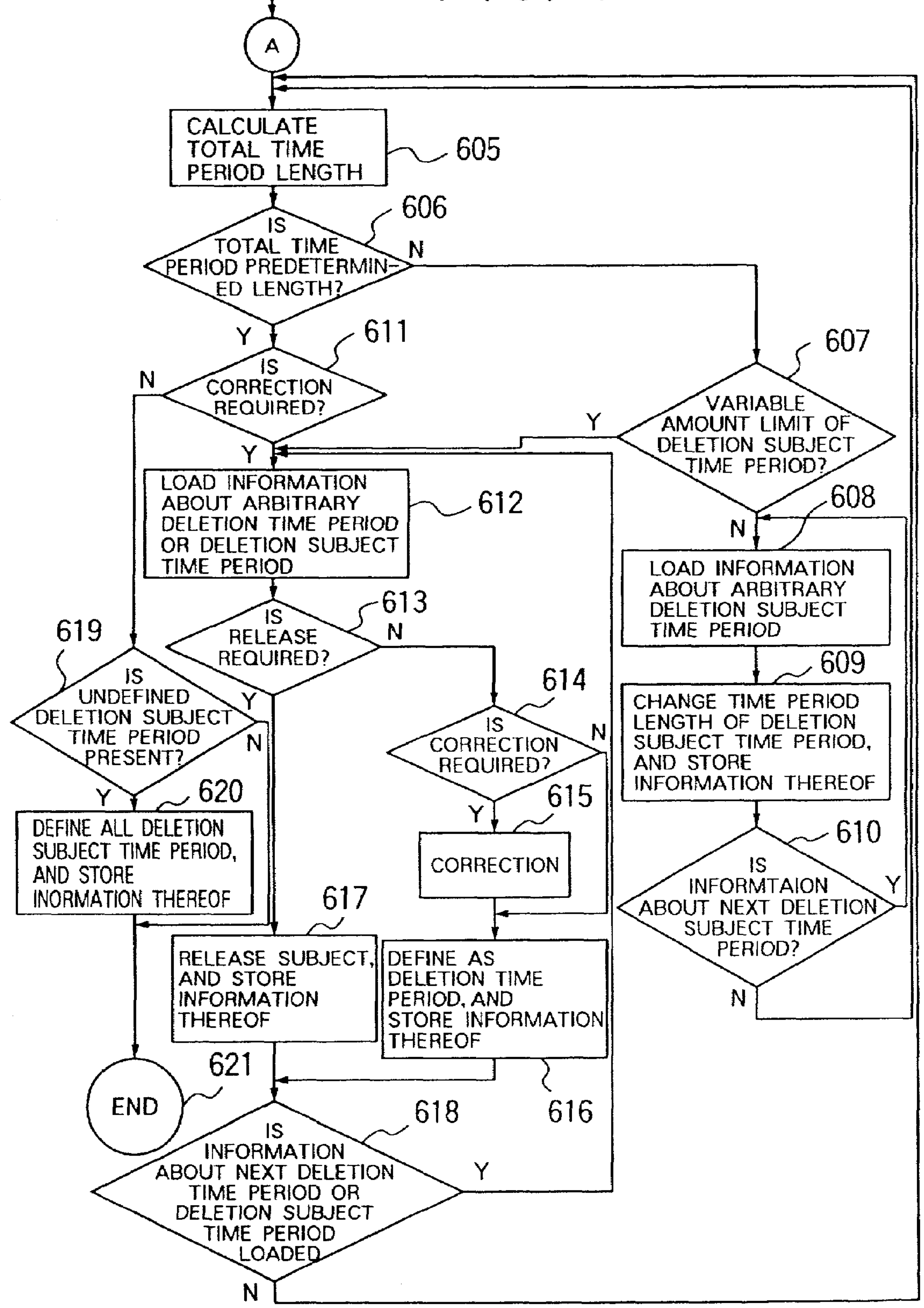

(FIG. 8A)
FIG. 8B
A
CALCULATE TOTAL TIME PERIOD LENGTH
605
IS TOTAL TIME PERIOD PREDETERMINED LENGTH?
606
N
Y
IS CORRECTION REQUIRED?
611
N
Y
607
VARIABLE AMOUNT LIMIT OF DELETION SUBJECT TIME PERIOD?
Y
N
608
LOAD INFORMATION ABOUT ARBITRARY DELETION TIME PERIOD OR DELETION SUBJECT TIME PERIOD
612
LOAD INFORMATION ABOUT ARBITRARY DELETION SUBJECT TIME PERIOD
IS RELEASE REQUIRED?
613
N
Y
619
IS UNDEFINED DELETION SUBJECT TIME PERIOD PRESENT?
Y
N
614
IS CORRECTION REQUIRED?
N
Y
609
CHANGE TIME PERIOD LENGTH OF DELETION SUBJECT TIME PERIOD, AND STORE INFORMATION THEREOF
620
DEFINE ALL DELETION SUBJECT TIME PERIOD, AND STORE INORMATION THEREOF
615
CORRECTION
610
IS INFORMTAION ABOUT NEXT DELETION SUBJECT TIME PERIOD?
Y
N
617
RELEASE SUBJECT, AND STORE INFORMATION THEREOF
DEFINE AS DELETION TIME PERIOD, AND STORE INFORMATION THEREOF
621
END
618
616
IS INFORMATION ABOUT NEXT DELETION TIME PERIOD OR DELETION SUBJECT TIME PERIOD LOADED
Y
N

800
START
801
REPRODUCE MATERIAL
802
IS DIVIDABLE SUBJECT POSITION DETECTED?
803
N
Y
RECORD TIME CODE AND SUMMARY OF SCENE
804
IS MATERIAL ENDED?
N
Y
805
DETERMINE DIVIDABLE POINTS ON DESK
806
START REPRODUCING OF MATERIAL
807
START RECORDING AT "OUT" POINT
808
STOP RECORDING AT "IN" POINT
809
IS MATERIAL ENDED?
810
N
Y
END
811

EDITING METHOD FOR RECORDED INFORMATION

The present application is a continuation-in-part of application Ser. No. 08/867,192, filed Jun. 2, 1997, by S. MURATA, et al, entitled "EDITING METHOD FOR RECORDED INFORMATION", the contents of which is incorporated herein:

BACKGROUND OF THE INVENTION

The present invention generally relates to an editing method for picture information. More specifically, the present invention is directed to a recorded information editing method, apparatus and computer program for effectively executing an editing work while displaying an editing subject position in picture (video) information.

In television broadcasting stations for handling television program broadcasting and in CATV (cable television) stations for handling wired program broadcasting, for instance, program materials of picture information such as dramas and movies (films) are purchased from program producing firms, and then desirable programs are produced based on these program materials. While a program material is divided and a predetermined portion of the divided material is deleted thereby to reduce the program material, if necessary, a CM (commercial message) is inserted into a proper position within this reduced program to thereby obtain the edited program which will then be finally broadcasted.

For example, in the case that the purchased program material corresponds to a drama reproducible for 30 minutes, this drama is reduced into a drama reproducible for 24 minutes, and a CM reproducible for 6 minutes is inserted into this reduced drama reproducible for 24 minutes. Finally, an edited drama program (desirable program) reproducible for 30 minutes is broadcasted. To this end, the editing work is required to shorten the purchased drama reproducible for 30 minutes to obtain the drama reproducible for 24 minutes. In general, editing of a program material is called "role editing". In this case, the expression "role" implies a portion of a program whose contents are continued and which is transmitted without making any interruption in the contents.

Now, a description will be provided of the editing method in the case that the program material is role-edited to produce a broadcasting program reproducible of 30 minutes by employing the conventional picture 15 (video) editing apparatus. In this editing work, as a CM to be inserted into this broadcasting program reproducible for 30 minutes, this commercial message is subdivided into 4 CM portions, namely a pre-CM, an intermediate CM1, another intermediate CM2, and a post-CM. These four sub-divided CMs are inserted into positions within a predetermined range of this program reproducible for 30 minutes.

FIG. 4 is a schematic block diagram representing one example of a general-purpose picture editing apparatus. In FIG. 4, in a VTR (video tape recorder) 50, a video (picture) signal is reproduced from a video tape on which a program material and a CM content have been recorded, and then the reproduced video signal is outputted. In a control apparatus 54, the video signal reproduced from the VTR 50 is inputted, and editing control information is produced based on the inputted video signal in response to an instruction of an operator. As this editing control information, there are information used to designate a position of a picture dividing point in the program material, and information used to designate a fade-in position, or a fade-out position. Also, the video signal entered from the VTR 50 is outputted from the control apparatus 54 to a monitor 52 and also to another VTR 51. The monitor 52 displays an image based upon the entered video signal, so that the images of the program material reproduced by the VTR 50 may be displayed. In the VTR 51, the video signal corresponding to the entered editing result is recorded, and further either the inputted video signal or the recorded video signal is outputted to the monitor 53. The monitor 53 displays an image in response to the inputted video signal, and also displays the images of the program material inputted to the VTR 51. It should be noted that the reproducing operations and the recording operations of the VTR 50 and the VTR 51 are controlled in response to various control signals outputted from the control apparatus 54. Next, referring now to a flow chart shown in FIG. 10, operations of the conventional editing method for performing the role editing work with employment of the above-described editing apparatus indicated in FIG. 4 will be described. It should be noted that all of the flow operations shown in FIG. 10 are executed by manually operating the control apparatus 54 while an editor observes the images reproduced on the monitor 52.

First at a step 802 of FIG. 10, the video tape on which the program material has been recorded is set to the VTR 50, and then the VTR 50 reproduces this program material. At this time, the time code signal is superimposed on the reproduced video (picture) signal, and the superimposed video signal is derived from the VTR 50. The reproduction starting operation and the fast forwarding operation of the program material by this VTR 50 are controlled by outputting the control signals from the control apparatus 54, for instance, in accordance with the instruction issued from the operator. In this case, while the operator observes the images which are reproduced by the VTR So and displayed on the monitor 52, this operator instructs the control apparatus 54 to control the operations of the VTR 50.

At the next step 803, the operator visually detects a cuttable (dividable) subject (nominated) position of the program material. When at this step 803, a proper dividable subject position is detected and this detected position is instructed via the control apparatus 54 by the operator, the process operation is advanced to a step 804. Conversely, when the proper dividable subject position is not detected but also no instruction is made by the operator, the process operation is advanced to a step 805. At the step 804, the time code signal of the detected dividable subject position is recorded by the control apparatus 54, and then the process operation is advanced to a step 805. It should be understood that a memorandum related to a summary of a scene content, and a picture continuity may be separately written down by the operator, if required.

At the step 805, the control apparatus 54 confirms as to whether or not the program material from which the dividable subject positions should be detected at the above step 803 is accomplished. When this program material is accomplished, the process operation is advanced to a step 806. To the contrary, if this program material is not yet accomplished, then the process operation is returned to the previous step 803 in order to detect the dividable subject positions of the remaining program material.

As a result, when the retrieving operation for detecting the dividable subject positions with respect to the program material from which the dividable subject positions are detected is accomplished, an editing work is carried out after the next step 806, in which the video signal is correctly recorded.

At the step 806, two sorts of proper role dividing points are finally determined from several dividable subject positions by the operator. That is, both a position of an IN point corresponding to a starting point of a role, and a position of an OUT point corresponding to an end point of the role are finally determined by the operator. In this case, the positions of the respective points are determined in such a manner that assuming that a time period defined from each of the OUT points (containing the starting position of the program material) to the next nearest IN point (containing the end position of the program material) is recognized as a deletion period, an accumulated value which is summed up all of these deletion periods becomes 6 minutes which are calculated by subtracting 24 minutes from 30 minutes.

In general, there are many possibilities that a range of a time zone when a CM is inserted into one program is previously set. At this step 806, the positions of the several IN points and the positions of the several OUT points are located within a predetermined time zone during which this CM is inserted, if necessary.

In this example, the CM inserting subject (nominated) points are determined in such a way that since a total time period of the program is 30 minutes, the pre-CM is inserted into such a time zone close to the program starting time (namely, after 2 minutes to 3 minutes have passed from the commencement of this program). Next, the intermediate CM1 is inserted in such a time zone defined by that approximately 10 minutes have passed after the program was commenced. Also, the intermediate CM2 is inserted into such a time zone defined by that approximately 20 minutes have passed after the program was started. The last post-CM is inserted into such a time zone close to the end of this program (namely, 2 minutes to 3 minutes before this program is ended).

At the next step 807, the reproduction for the video signal is again commenced from the VTR 50. At a further step 808, based upon the information such as the time code signals about the IN point and the OUT point determined at the step 806, the video signal and the audio (sound) signal of the program material between the OUT point and the IN point are deleted. On the other hand, the CM picture material is reproduced by the VTR 50, and the reproduced CM picture is started to be inserted at the position of the OUT point. At a step 809, the insertion of this CM picture is ended at the next IN point. During a time period of the operation of the step 808 to the step 809, the edited picture information into which the CM picture (containing sound) has been inserted is recorded by the VTR 51.

In this case, since the recorded pictures are displayed on the monitor 53 while the edited video signal is recorded on the VTR 51, the contents of the images can be confirmed.

At the next step 810, a confirmation is made as to whether or not the editing works are accomplished with respect to all of the material portions which should be edited at the step between the step 807 and the step 809. When the editing works have been accomplished, the process operation is advanced to a step 811. Conversely, when the editing works are not yet ended, the process operation is returned to the above-described step 807 in order to execute the role editing work with respect to the remaining material portions which should be role edited.

As previously described, in the conventional editing method, while simultaneously monitoring the reproduced image and the reproduced sound based upon the video signal and the audio signal produced by reproducing the program material, the operator manually determines the IN point and the OUT point, which will constitute the role dividing points. Then, the information related to these IN point and OUT point is recorded. For instance, the time code information in which the field period is used as a minimum unit is recorded. This time code information is immediately called during the dubbing operation. To determine such a role dividing point, the program portion where the content of the program is interrupted while the material is reproduced, the transit portion between the continuous scenes, or such a specific program portion is searched. The specific program portion can be broadcasted even when the CM is inserted into the content of the program. Generally speaking, there are very large amounts of picture information, and there is the variety of these picture contents, so that the role dividing points are manually determined by the operator. As a result, while the program material to be edited is reproduced during this role-dividing-point determining work, the operator is forcibly restricted to this role-dividing-point determining work irrelevant to such a fact as to whether or not the role dividing point is actually detected.

Also, in this conventional editing method, when the program material is reproduced, a person observes/listens to the contents of the reproduced program material while confirming that the image is synchronized with the sound, considering such a fact that the role dividing points are manually detected by this person. In this case, since the program material is reproduced based on the reproducing speed fitted to feelings of the person, namely the reproducing speed is limited to the substantially normal reproducing speed, there is no possibility to increase the detection work speed.

Japanese Patent Application Un-examined laid-open publication No. JP-A-2-184181 shows a moving picture editing apparatus wherein a dividable point of a moving picture is detected by analyzing sound volume related to the moving picture. Another Japanese Patent Application Unexamined laid-open publication No. JP-A-5-290549 teaches an adding apparatus in editing of picture wherein a picture information is divided with a dividing standard of an audio information such as a pause of music, a condition of existing a certain speaker detected by a speech recognition, a noise level, and a noise characteristic.

Furthermore, various conventional methods and apparatuses are disclosed by U.S. Pat. Nos. 5,467,288, 4,602,297 and 5,227,892, and International Publication No. Wo 94/16443 and UK Patent Application No. GB 2,245,748A (corresponding to U.S. Pat. No. 5,227,892). Detailed descriptions of these references are as follows.

U.S. Pat. No. 5,467,288 discloses a system for editing the digital audio portion of video programs, that is, the editing of audio data is aided by displaying any video information which corresponds to the audio data. U.S. Pat. No. 4,602,297 discloses that the video content of the television signal may be sensed at the beginning and end of each commercial of a multi-commercial group to determine whether the amplitude drop in the video and audio content actually represented a commercial, so that the system operates to prevent the recording of all of the commercial massages in the group precisely from the start of the first commercial to the end of the last commercial. U.S. Pat. No. 5,227,892 discloses methods and apparatus for editing a digital audio signal recorded on a record medium in association with a video signal. International Publication No. WO 94/16443 discloses a computerized multimedia editing system which facilitate audio editing, that is, to facilitate editing, a display system is developed which represents an audio track as a discrete waveform indicating the presence of sound energy above user-set thresholds. In the above described conventional methods and apparatuses there is no description of editing a video signal based on an audio signal. Particularly, there is no teaching of editing a video signal to produce a plurality of candidates, each of which has a suitable period, marking video information on the video signal based on the audio signal in order to insert commercial messages, confirming by an operator on a display whether the commercial messages are properly inserted, and deciding to insert the proper commercial message after has confirmed.

SUMMARY OF THE INVENTION

An aspect of the present invention is to provide an editing method, apparatuses and computer program capable of automatically detecting/displaying a plurality of candidates for editing points of recording information in order to insert commercial massages, this information having such a format that both a video (picture) signal and a sound (audio) signal are recorded on a recording medium, on the basis of the predetermined level of the audio signal, whereby an editor can simply confirm and determine the editing point.

Further, according to the present invention, it is possible to provide a storage medium for storing therein procedure of the above-described editing method in a format of a program code read/executed by a computer.

In the method for editing the recorded information according to the present invention, the recorded information is reproduced; a detection is made as to whether or not a predetermined condition is produced in the audio signal of the recorded information which is being reproduced; discriminating information indicative of an editing position is produced based a position where the predetermined condition in the recorded information is detected; and then the discriminating information is displayed on a screen of a display apparatus in order to confirm whether the position is properly to insert a commercial message.

The storage medium for storing the program Code read/executed by the computer, according to the present invention, stores therein a first section for storing therein a program code of procedure used to detect as to whether or not a predetermined condition is produced in an audio signal while reproducing recorded information containing a video signal and an audio signal related to this video signal; and a second section for storing therein another program code of procedure used to produce discriminating information indicative of a position where a predetermined state in the recorded information is detected, and also used to display this discriminating information on a screen of a display apparatus.

In accordance with an embodiment of the present invention, based upon such a portion that the level of the audio (sound) signal becomes lower than, or equal to a predetermined level during a time period longer than, or equal to predetermined time, e.g., presence of a silent portion, both the dividable subject point and the deletion subject (nominated) time period involved in this silent portion are automatically detected, and then are stored. The work required to manually detect or determine the positions of the deletion subject time periods can be considerably reduced, so that the work efficiency for the role editing operation can be improved.

Also, according to another embodiment of the present invention, the time period length of the deletion subject time period is automatically corrected in connection with the time period of the program material, so that the work required to manually setting the time period length of the program material can be considerably reduced, and further the work efficiency for the role editing operation can be improved.

BRIEF DESCRIPTION OF THE DRAWINGS

FIGS. 7A and 7B show a flow chart for describing a sequential operation of a picture editing method according to an embodiment of the present invention;

FIGS. 8A and 8B show a flow chart for describing a sequential operation of a picture editing method according to an embodiment of the present invention;

DESCRIPTION OF THE REFERRED EMBODIMENTS

There is shown a schematic block diagram of a picture (video) signal editing apparatus according to the present invention.

Figure 2:
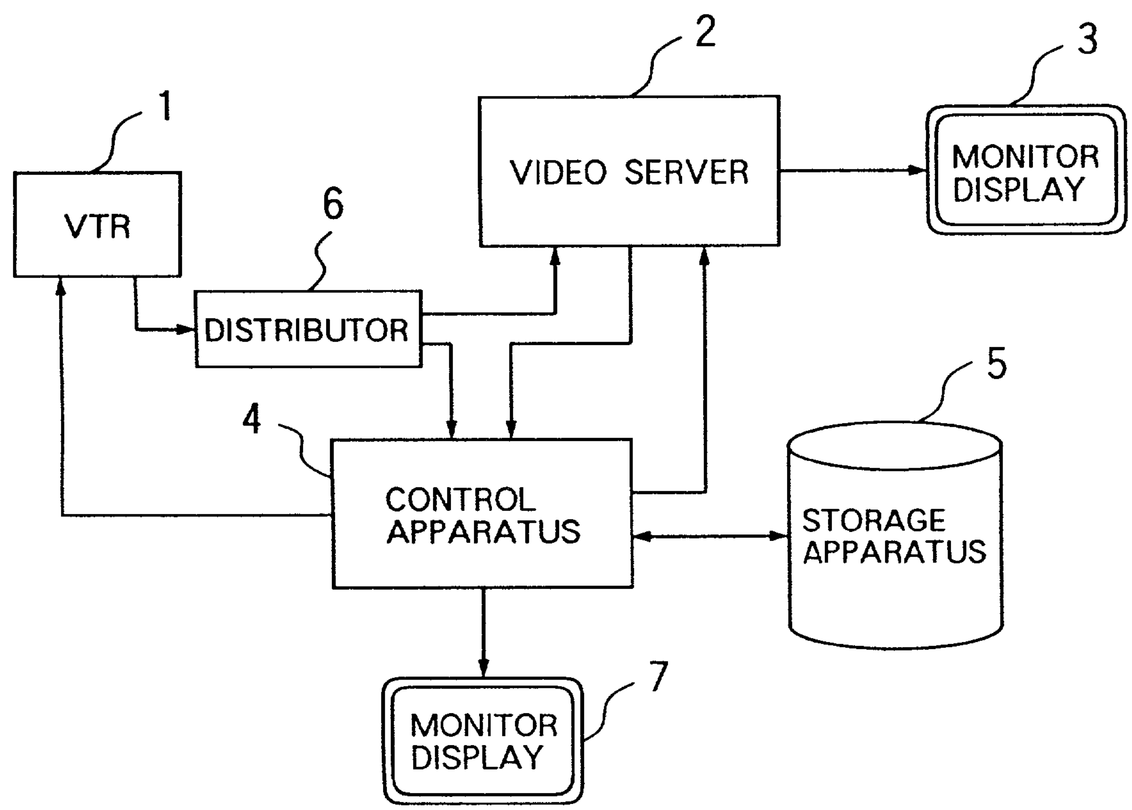
FIG. 2 is a schematic block diagram of a picture editing apparatus capable of executing the picture editing method according to the present invention.

In a VTR (video tape recorder) 1 of FIG. 2, a video (picture) signal and an audio (sound) signal, which will be edited, are reproduced from a video tape on which a program material and a CM content have been recorded. The video signal and the audio signal, which are outputted from the VTR 1, are inputted to a distributor 6, and thereafter are distributed to a video server 2 and a control apparatus 4, respectively. The video server 2 is a storage apparatus capable of accessing at random to a region where information has been stored, for instance, a disk type recording apparatus. The access operations (namely, read/write operations) to the storage region of the video server 2 is controlled by the control apparatus 4. The control apparatus 4 contains a computer (not shown in detail) and a storage device (not shown either) for storing therein the information outputted from the VTR 1 and the video server 2. This computer includes a CPU (not shown) for executing an information process in response to a program, and a memory (not shown either) for storing therein a control program. The video signal and the audio signal supplied from the distributor 6 are entered into the video server 2, and are recorded therein in the random access system. As a consequent, the entered signals are converted into picture (video) information in accordance with a predetermined format, which will then be recorded in this video server 2. The picture information recorded in the video server 2 is converted into the corresponding video signal and audio signal, if required, which will then be outputted to either a monitor 3 or the control apparatus 4. It should be noted that these signals having the above-described format may be directly outputted to the control apparatus 4. Alternatively, the format of these signals are once converted into another different sort of format, and the format-converted signals may be outputted to the control apparatus 4.

In the control apparatus 4, the picture information such as the video signal and the audio signal is inputted, and control data for the editing purpose and the like are produced based on the inputted picture information. Then, the produced control data and the like are held in the control apparatus 4 or the storage apparatus 5 connected to this control apparatus 4. From this control apparatus 4, control signals used to control the VTR 1 and the video server 2 are outputted based on this control data. Thus, the reproducing operations of the VTR 1 and the video server 2, and also the recording operation of the video server 2 are controlled in response to these control signals.

To confirm a content of an editing control operation and/or an editing condition by an operator, a display apparatus 7 connected to the control apparatus 4 displays information related to the control data, the video signal, and the audio signal in response to a display signal supplied from the control apparatus 4, for instance, information related to a time code signal and a summary of a scene. It should be understood that the display apparatus 7 may display a representation capable of inputting data in combination with operations of an input device (not shown) such as a mouse manipulated by the operator.

Referring now to a flow chart of FIG. 1 for describing a picture editing method of the present invention and also to the display screen example on the display apparatus 7, the picture editing method according to one embodiment of the present invention will be explained and this picture editing method is employed in the picture signal editing apparatus with the above-described arrangement.

Figure 1:
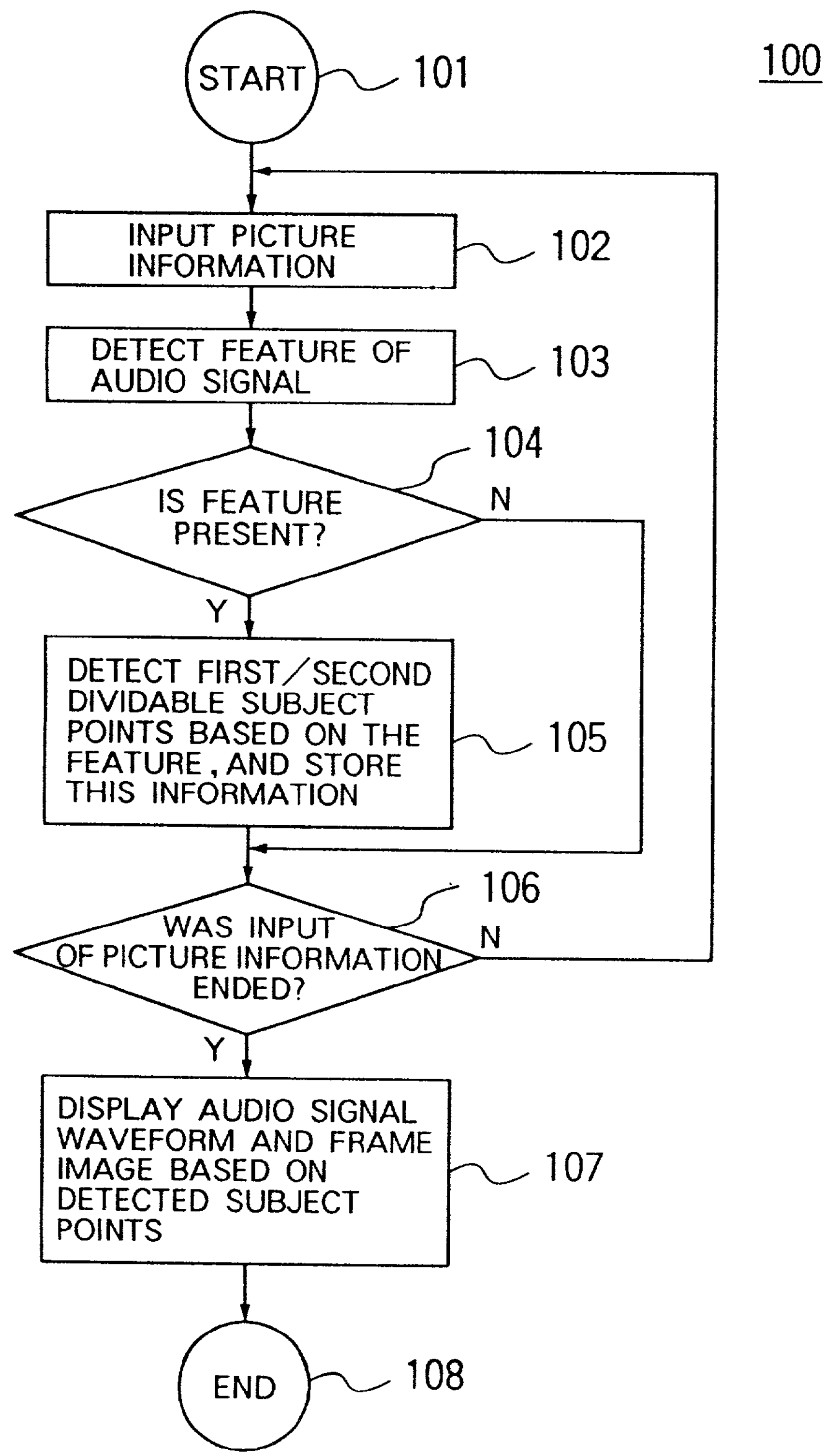
FIG. 1 is a flow chart for explaining a sequential operation of a picture editing method according to an embodiment of the present invention.

In FIG. 1, there is shown a sequential operation such that a dividable position for the role editing operation is detected to be displayed by the picture editing apparatus. At a first step 102, the video tape on which the program material is recorded is set to the VTR 1, and then the VTR 1 reproduces the program material. At this time, for example, the video signal, or the audio signal is reproduced by the VTR 1, on which the time code signal is superimposed. Then, the superimposed video signal, or the superimposed audio signal is sent to a distributor 6. The reproducing operation of the program material by this VTR 1 is controlled by, for example, outputting a control signal from the control apparatus 4 based upon an instruction issued from the operator. The picture information constituted by the video signal and the audio signal outputted from the VTR 1 is inputted via the distributor 6 to the video server 2, and similarly is entered into the control apparatus 4.

At the subsequent step 103, the control apparatus 4 executes a feature detection of the audio signal of the inputted picture information in order to extract an optimum position which may be utilized as a dividable subject point. One example of this audio signal feature detection is given as follows. In the picture information inputted from the video server 2, or the audio signal of the picture information entered via the distributor 6, a preselected feature is detected. For instance, a detection is made of such a fact that the level of the audio signal during the reproducing operation of this audio signal becomes lower than, or equal to a predetermined level over a predetermined time period (namely, silent condition) for example 0.5-2.0 seconds, in particular 1 second.

The above-mentioned automatic decision of the dividable subject point by detecting the silent condition may be performed by employing a detector (not shown in detail) for detecting the level of the audio signal, and also a signal comparing circuit (not shown either) within the control apparatus 4. This signal comparing circuit compares the level of the detected audio signal with a predetermined threshold value, and counts such a time period during which the detected level becomes lower than, or equal to this threshold value. Then, when the counted value exceeds a reference value, it is set as the dividable subject point. This dividable subject point is recognized as an OUT point subject.

At the next step 104, when the control apparatus 4 judges that the detection result obtained at the step 103 corresponds to the relevant feature, the process operation is advanced to a step 105. To the contrary, when the detection result does not correspond to the relevant feature, the process operation is advanced to a step 106.

At the step 105, as previously explained, a predetermined feature of the audio (sound) signal is detected by the control apparatus 4, for instance, a detection is made of such a time period (first time period) during which the level of the audio signal becomes lower than, or equal to a predetermined level over predetermined time while the audio signal is reproduced. Then, within this first time period, a first dividable subject point (OUT point) in the audio signal and a second dividable subject point (IN point) in the video signal related to this first dividable subject point (IN point) are selected. Thereafter, the control apparatus 4 stores therein the information related to these first and second dividable subject points, for example, the time code signal, or supplies this information to the storage apparatus 5. Thus, the storage apparatus 5 stores therein this information. Then, the process operation is advanced to a further step 106.

There is another method capable of detecting the feature of the audio signal. In such a program material that a conversation is a main subject as in a meeting, a frequency range of this audio (sound) signal is concentrated into a range from 300 to 3,400 Hz. On the other hand, in another program material such as a concert recorded material, an energy component of an audio signal is distributed into a frequency range wider than the above-described frequency range. As a result, an interrupted portion in a scene can be detected by sensing that the component of the specific frequency range is reduced in the audio signal, or by sensing such a case that the specific frequency range is changed into another frequency range. As a consequence, this interrupted portion may constitute a subject (nominated) of a dividable point. For instance, the audio signal is filtered by a band-pass filter having a pass-band frequency of 300 to 3,400 Hz, and an output level of the filtered audio signal is compared with a reference value. In the case that the output level lower than, or equal to the reference value is continued for a predetermined time period, it may be used as the dividable subject point.

Also, in the case that a specific sound is superimposed on the background sound, a sound having a sound quality other than the superimposed sound component is detected. When the sound quality or sound volume is changed, it may be used as the dividable subject point. For example, sound having sound qualities other than sound qualities of sounds such as sounds of a helicopter, sounds of sea waves, and sounds of frogs in weeds are sensed. When the sound quality or sound volume of the detected sound is changed and the changed sound quality or volume is continued for a predetermined time period, it may be used as the dividable subject point.

At the step 106, a check is made by the control apparatus 4 as to whether or not the input operation of the picture information in which the feature of the audio signal should be detected is accomplished. When this picture information input operation is ended, the process operation is advanced to a further step 107. Conversely, when this picture information input operation is-not yet completed, the process operation is returned to the step 102 in order to further input the picture information. It should also be noted that when the picture information in which the feature of the audio signal should be detected has already been stored in the control apparatus 4, since the picture information need not be loaded on the control apparatus 4, the process operation is not returned to the step 102, but may be returned to the step 103.

Figure 3:
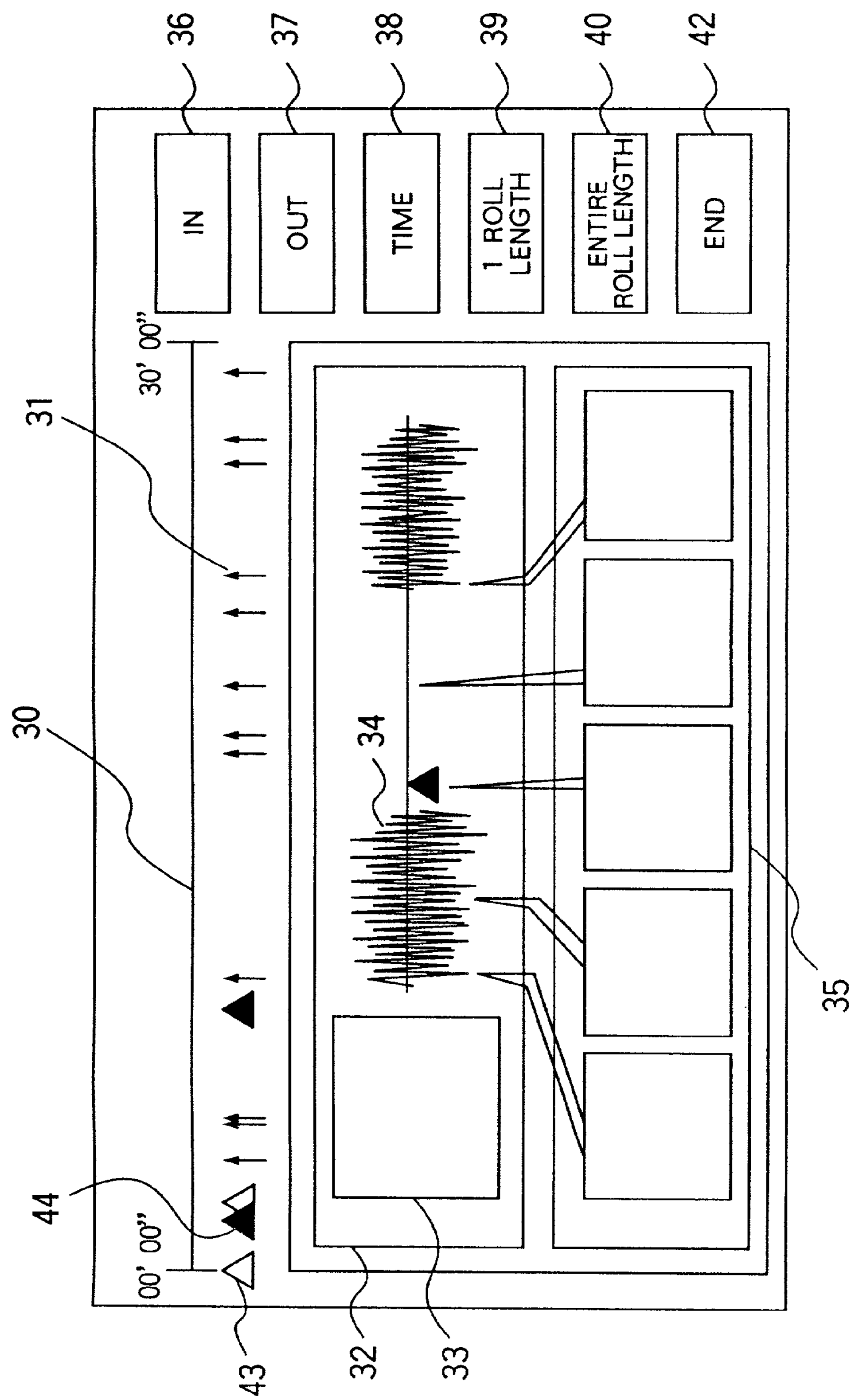
FIG. 3 illustrates an example of a display screen in a display unit of the picture editing apparatus capable of performing the picture editing method according to the present invention.

At a step 107, the display unit 7 displays a waveform of an audio signal and a frame image relevant to this audio signal based on the selected subject point. referring now to FIG. 3, an example of this display will be explained as follows:

As previously described, when each of these subject points is selected, the display unit 7 connected to the control apparatus 4 displays a screen image as shown in FIG. 3 based on either the information stored in the storage apparatus 5 or the information saved in the control apparatus 4. In FIG. 3, reference numeral 30 indicates a scale under which while the value of the time code signal among the picture information is set to an abscissa, the information thereof is temporally displayed. An arrow 31 represents the dividable subject point (OUT point subject) which is automatically detected based on the feature of the audio signal. A destination denoted by this arrow 31 is a value of a time code of the scale 30. Alternatively, the arrow 31 may be replaced by a symbol indicative of a representative position of a section to be subdivided. As shown in FIG. 3, there are certain possibilities that a plurality of dividable subject points may be detected. As will be explained later, a proper point is selected from these plural dividable subject points. Reference numeral 32 denotes a cut-portion-enlarged display region in which when one of the subject points 31 is selected, both a still image (frame image) 33 and an audio waveform 34, which are related to this position. Accordingly, the contents of the sound and the picture related to the selected subject point can be confirmed. Also, reference numeral 35 is a main editing cut image portion, on which the still images before/after the IN point and the OUT point, corresponding to the dividable subject points, are displayed. The still images displayed on this main editing cut image display unit 35 are intended to give such a merit. That is, when the operator issues the instruction to correct/set these IN point and OUT point, the operator can readily determine the content of his instruction while observing these still images.

Also, an IN point setting button 36 represents a button display capable of determining a starting point of a material portion used in program broadcasting, namely an IN point by manipulating the mouse by the operator so as to use a cursor moved on the screen. Similarly, an OUT point setting button 37 is such a button display capable of determining an end point of the material portion used in program broadcasting. A time code display portion 38 displays a value of a time code signal related to a selected dividable subject point when the dividable subject point is selected. A 1-role length display unit 39 displays a length defined from an IN point to an OUT point of a certain single role among the program portions (role) used in broadcasting in the unit of time. An entire role length display unit 40 displays total time obtained by adding the lengths from the IN point to the OUT point of the role-edited program portions among all of the program portions used in broadcasting. Then, reference numeral 42 indicates an end button capable of displaying that the end of the role editing operation is instructed.

While the cursor is positioned at an arrow of a desirable dividable subject point, the IN point setting button 36 is clicked by way of the mouse, a white triangle symbol is displayed on the screen, as indicated as "43" in FIG. 3. This white triangle symbol 43 represents the position of the determined IN point on the scale 30.

While the cursor is positioned at an arrow of a desirable dividable subject point, the OUT point setting button 37 is clicked by way of the mouse, a black triangle symbol is displayed on the screen, as indicated as "44", in FIG. 3. This black triangle symbol 44 represents the dot position of the determined OUT point on the scale 30. It should be noted that after both the IN point 43 and the OUT point 44 have been set, it is also possible to change/delete this position.

Figure 5:
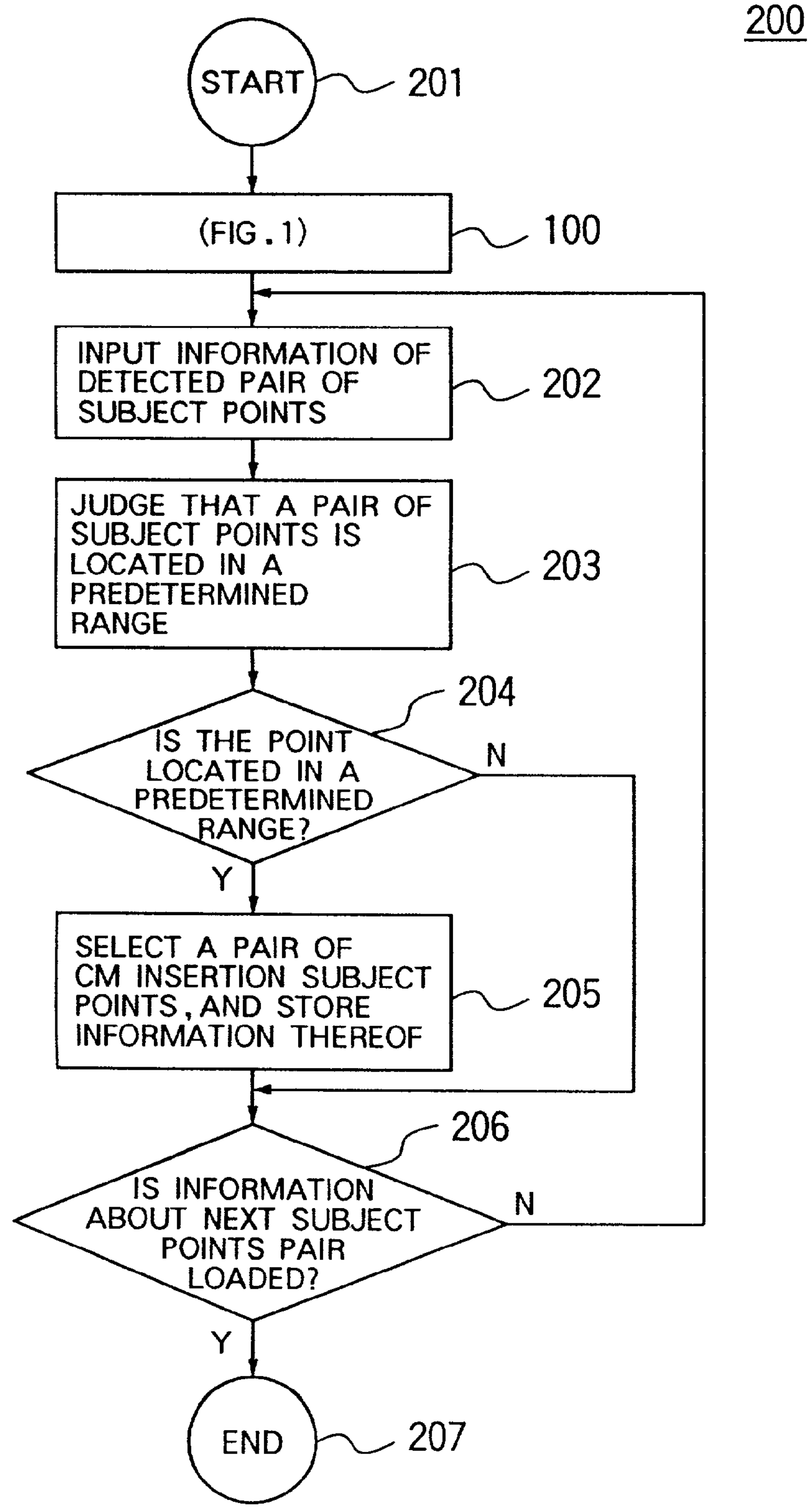
FIG. 5 is a flow chart for describing a sequential operation of a picture editing method according to an embodiment of the present invention.

Referring now to a flow chart of FIG. 5, a description will be made of a sequential operation for selecting a CM insertion subject point.

First, at a step 202, the control apparatus 4 loads the information related to the subject points pair including the first dividable subject point (OUT point) and the second dividable subject point (IN point) detected in the sequential operation (step 100) shown in FIG. 1 from the storage apparatus 5 in such a case that, for instance, this information has been stored in this storage apparatus at the step 105. It should be understood that if this information is still saved in the control apparatus 4, then this information loading is not required.

At the next step 203, based on the information such as the time code signal of the subject (nominated) points pair, the control apparatus 4 determines any one of the positions for a plurality of subject points being located within a predetermined range of the broadcasting program in order to insert the video signals and the audio signals of the respective pre-CM, intermediate CM1, intermediate CM2, and post-CM.

At the next step 204, in the case that the control apparatus 4 judges that the position of the dividable subject point confirmed at the step 203 is located in the above-described preselected range, the process operation is advanced to a step 205. Conversely, when the control apparatus 4 judges that this position of the dividable subject point is not present in the abovementioned predetermined range, the process operation is advanced to a step 206.

At the step 205, the control apparatus 4 selects this dividable subject point as the CM insertion subject point based on such a fact that this dividable subject point is located in the above-described range. The information related to this CM insertion subject point, for instance, the time code signal is outputted to the control apparatus 5 and this information is then stored into the storage apparatus 5. Then, the process operation is advanced to the next step 206.

At this step 206, the control apparatus 4 judges as to whether or not all of the dividable subject points have been loaded in order to confirm whether or not the dividable subject points are selected as the CM insertion subject points. When all of these dividable subject points have been loaded, the process operation is advanced to the next step 207. Conversely, when all of these dividable subject points have not yet been loaded, the process operation is returned to the step 202 in order that the dividable subject points which have not yet been confirmed are loaded.

Since the CM insertion subject points are selected in the above-described manner, the picture editing work by the operator can be simply performed and therefore the operation efficiency is improved without retrieving the CM insertion subject points while the operator observes the reproduced images.

Next, a description will now be made of a process operation with reference to a flow chart of FIG. 6. In this process operation, a time period length of a deletion subject time period for constituting a subject of a deletion time period for unnecessary picture information which is preset between an IN point and an OUT point and is deleted, is adjusted by the control apparatus 4. Also, a total time period made by a time period for the remaining picture information and a time period for the CM information to be inserted is adjusted so as to be limited to a broadcasting time period.

Figure 6:
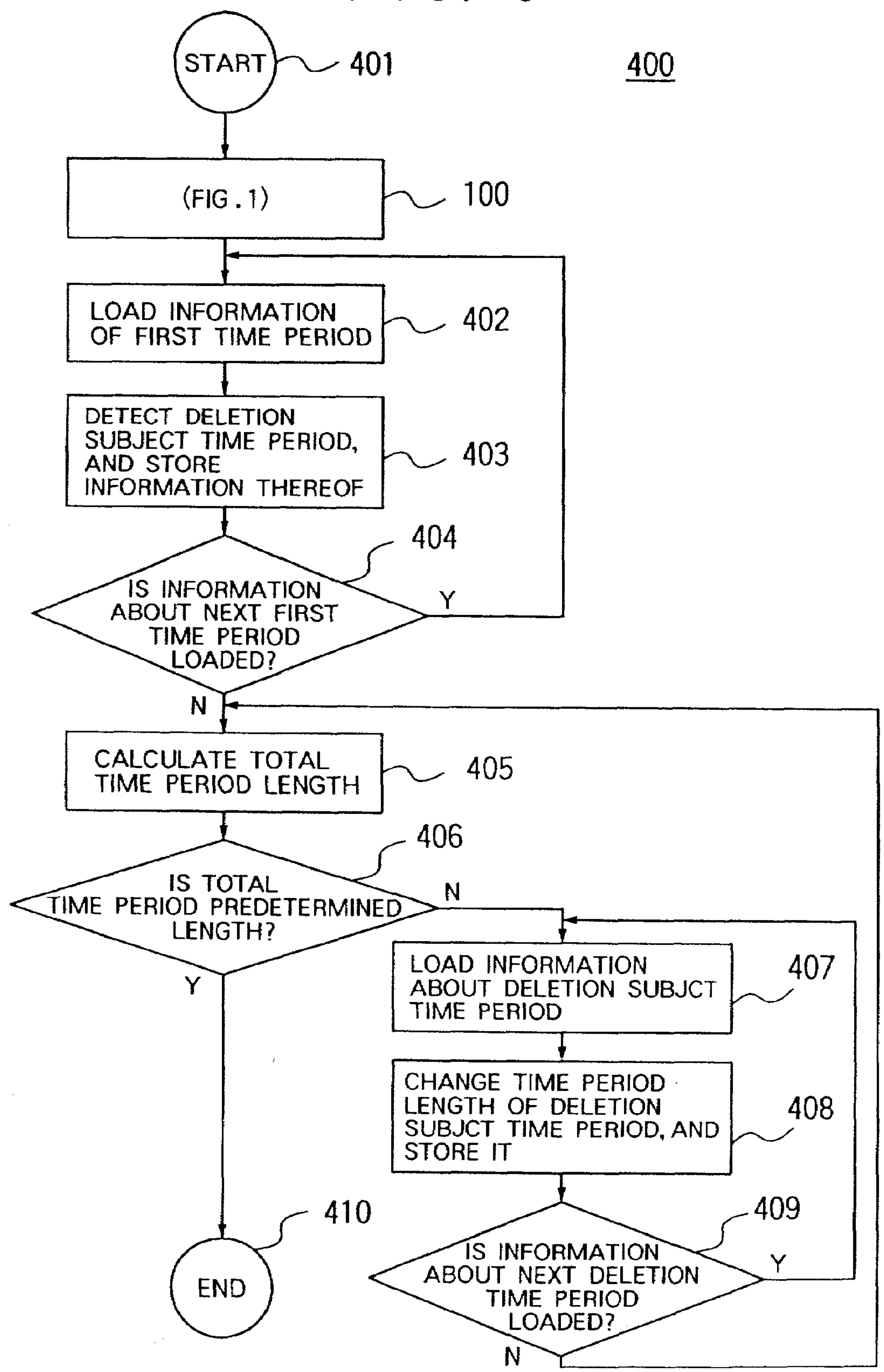
FIG. 6 is a flow chart for describing a sequential operation of a picture editing method according to an embodiment of the present invention.

At a step 402 of FIG. 6, the information, for instance, the time code signals of the respective starting point and end point for the first time period are loaded from the storage apparatus 5 by the control apparatus 4. This information is related to the dividable subject point detected in the sequential operation (step 100) shown in FIG. 1, and to the time period (first time period) during which the level of the audio signal is lower than, or equal to a predetermined level. It should be noted that if this information is still saved in the control apparatus 4, then this information loading operation is not particularly required. At the next step 403, the control apparatus 4 detects a time period defined between each of OUT points (containing picture information end point) and an IN point immediately after this OUT point within this first time period as a subject time period of a deleted time period, namely, as a deletion subject time period. Then, the information related to this deletion subject time period, for example, the time code signal is outputted from the control apparatus 4 to the storage apparatus 5, and this information is stored in the storage apparatus 5.

At the subsequent step 404, the control apparatus 4 judges as to whether or not information related to a further first time period is loaded subsequent to the above-described information related to the first time period loaded at the step 402. As a result of this judgment, when this information about the further first time period is not loaded, the process operation is advanced to a step 405. Conversely, when this information is loaded, the process operation is returned to the previous step 402 in order to load the information related to the next first time period. With execution of the above-described process operation, all of the deletion subject time periods related to the first time period are detected, and the information such as the time period lengths related to the detected deletion subject time periods has been stored. Accordingly, at the next step 405, a calculation is made of a total value of these time period lengths of the deletion subject time periods. Upon receipt of this calculation result, at a further step 406, the control apparatus 4 judges as to whether or not the total time period length of the deletion subject time periods is equal to a predetermined length. When this total time period length is made coincident with a predetermined length, the process operation is advanced to a step 410. Conversely, when this total time period length is not made coincident with a predetermined length, the process operation is advanced to a step 407 in order that this total time period is adjusted to be equal to this predetermined length.

At the step 407, the information about each of the deletion subject time periods is loaded by the control apparatus 4. Then, the process operation is advanced to a step 408. At this step 408, the control apparatus 4 changes the time period length of each of these deletion subject time periods by using a predetermined sequential operation in such a manner that this time period becomes an optimum time period length, and information related to the changed deletion subject time period, for example, a time period length thereof is stored.

As an example of a process operation for changing the deletion subject time period explained at the step 408, the following methods may be proposed:

1). A calculation is made of a ratio of the total time period length of the deletion subject time periods to the predetermined length of the step 406. The calculated ratios are commonly changed into such a time period obtained by multiplying, or dividing the ratios by the time period length of each of the deletion subject time periods. For example, in the case that a total time period length of the deletion subject time periods is 8 minutes and the above-described predetermined length is 6 minutes, at least any of the positions of the IN points and the OUT points related to the respective deletion subject time periods are changed in such a manner that $6/8=0.75$ is equal to the time period length multiplied by the time period of each of the deletion subject time periods.

2). While at least one of the predetermined time and the predetermined level value set at the step 105 is selectable from a plurality of values, this value is properly selected, so that the time period length of each of the deletion subject time periods is changed. As a result, for example, when the total time period length of the deletion subject time periods is desirably prolonged, either a value shorter than the above-described predetermined time period is selected, or a value smaller than the above-described preselected level is selected, so that the total time period length can be shortened.

3). For instance, in the case that the total length of the deletion subject time periods is shortened in response to the time period length of each of the deletion subject time periods, if the time period length of each of the deletion subject time periods is shorter than a certain preselected length, then this deletion subject time period remains. If this time period length is equal to, or longer than this predetermined length, then the length of this deletion subject time period is shortened, so that the total length can be shortened. Furthermore, for example, in the case that the time period length of the deletion subject time period is prolonged, if the time period lengths of the respective deletion subject time periods are shorter than a certain reference value, then this deletion subject time period is excluded from the subject time periods, and then is changed into a time period which is not deleted. If the time period length is equal to, or longer than the reference value, then this time period length is maintained. —Thus, the total length is prolonged. Alternatively, the above-described methods 1) to 3) may be properly combined with each other to newly establish a process operation.

At the next step 409, the control apparatus 4 judges as to whether or not all of the deletion subject time periods are loaded. When all of the deletion subject time periods are loaded, the process operation is advanced to the step 405 so as to again calculate a total time period length. When all of the deletion subject time periods are not yet ended, the process operation is returned to the step 407 in order to load the information about the next deletion subject time period.

Since the above-defined operations are repeatedly performed, the total time period length of the deletion subject time periods can be made coincident with a predetermined length, or can be approximated to this predetermined length without requiring the confirmation setting work by the operator. As a result, the role editing work can be executed in a higher efficiency. Even if the above-described total time period length is not made coincident with a predetermined time period, the remaining works required to make this total time period length coincident with a predetermined time period by the operator can be considerably reduced.

Next, a description will now be made of a sequential operation such that positions of an OUT point and an IN point of a deletion subject time period are defined, and the deletion subject time period is set as a deletion time period with reference to FIGS. 7A and 7B. In this sequential operation, the positions of the OUT point and the IN point, and also a time period length are corrected, if required.

Figure 7A:
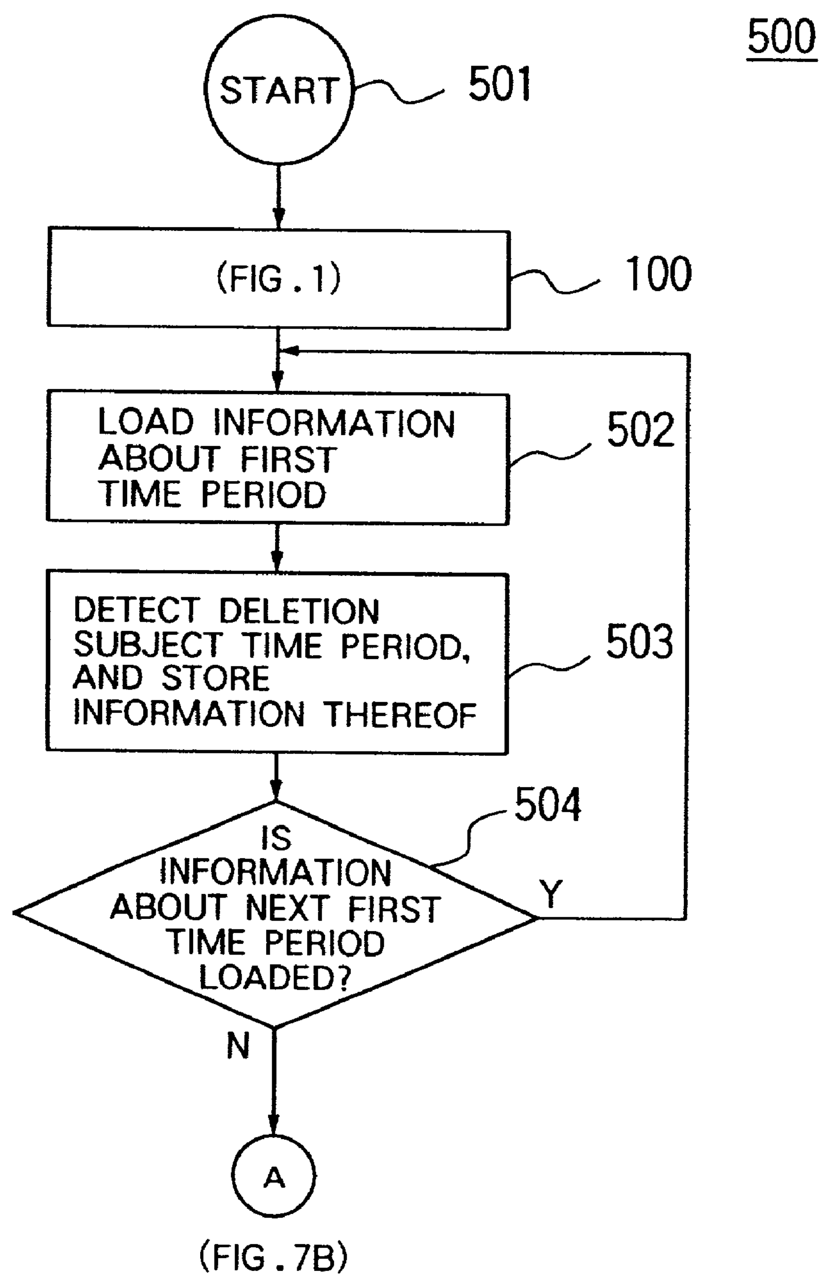

In FIGS. 7A and 7B, process operations defined from a step 501 to a step 505 are carried out in a similar manner to those defined from the step 401 to the step 405 of FIG. 6, respectively, in which deletion subject time periods are detected, and a total value of these deletion subject time periods is calculated.

Similar to the step 406, at a step 506 executed subsequent to the step 505, the control apparatus 4 judges as to whether or not the calculated total time period of the deletion subject time periods is made coincident with a predetermined length. When it is judged that the total time period length of the deletion subject time periods is equal to the predetermined length, the process operation is advanced to a step 511. Conversely, when this total time period length is not equal to this predetermined length, the process operation is advanced to a step 507. At this step 507, the control apparatus 4 detects as to whether or not each of the deletion subject time periods has the same width as the corresponding first time period. In the case that the deletion subject time period has the same width as the first time period, this deletion subject time period cannot be prolonged. In other words, there is no variable amount. Furthermore, when it is so judged that there is no variable amount as to all of the deletion subject time periods, namely the variable amount is limited, the process operation is advanced to a step 512. To the contrary, when it is judged that the variable amount is not limited, the process operation is advanced to a step 508. In such a case that there is no variable amount, if the deletion time period is changed to be prolonged, then a portion of the required video signal will be lost.

At the step 508, the control apparatus 4 loads the information about such a deletion subject time period that the variable amount is still present. At the next step 509, the control apparatus 4 varies the time period length of the loaded deletion subject time period within a range for a limit of this variable amount, and changes this time period length in such a manner that the above-described total amount is approximated to the above-explained predetermined amount. Then, the information related to this changed deletion subject time period such as the time code signal is stored in the storage apparatus 5.

At the subsequent step 510, the control apparatus 4 judges as to whether or not the next deletion subject time period is loaded. When it is judged that the next deletion subject time period is loaded, the process operation is returned to the step 508. Conversely when it is judged that the next deletion subject time period is not loaded, the process operation is advanced to the step 505 in order to calculate a total value of the time period lengths. At this step 505 and another step 506, an operation similar to the above-described operation is executed.

Then, in the case that the above-described total time period length is made coincident with a predetermined length at the step 506, as previously explained, the process operation is advanced to the next step 511. At the step 511, a check is done as to whether or not the length of the above-described time period is required to be corrected. To execute this checking operation, for example, when an instruction made by the operator is inputted into the control apparatus 4, the control apparatus 4 judges that the correction is required, or the correction is not required in response to this instruction. When the correction is not required, the process operation is advanced to a step 519. When the correction is needed, the process operation is advanced to a step 512.

When the correction is required, the control apparatus 4 loads the information about the deletion subject time period which should be corrected at the step 512. At the next step 512, a judgment is made as to whether or not this deletion subject time period is released from the deletion subject. To perform this judgment, for example, when an instruction issued from the operator is entered into the control apparatus 4, the control apparatus 4 judges that the release is required, or the release is not needed based on this instruction. When it is judged that the release is required, the process operation is advanced to a step 517. Conversely, when it is judged that the release is not needed, the process operation is advanced to the next step 514. At this step 514, the control apparatus 4 further judges as to whether or not the correction is required for the deletion subject time period. When the correction is needed, the process operation is advanced to a step 515, whereas when the correction is not required, the process operation is advanced to a step 516. At the step 515, the time period length related to the deletion subject time period is corrected. Then, the process operation is advanced to a further step 516.

At the step 516, the deletion subject time period is defined as a deletion time period by the control apparatus 4, and information related to this defined deletion period is stored in the storage apparatus 5. Thereafter, the process operation is advanced to a step 518.

At the step 517, the deletion subject time period is released from the deletion subject by the control apparatus 4, and information related to this released time period is stored in the storage apparatus 5. Then, the process operation is advanced to a step 518.

At the step 518, a judgment is made as to whether or not a next deletion subject time period for ,the time period released at the step 517, or defined at the step 516 is loaded on the control apparatus 4. When 10 it is judged that the next deletion subject time period is loaded, the process operation is returned to the step 512 at which information about the next deletion subject time period is loaded by the control apparatus 4. Conversely, when it is so judged that the next deletion subject time period is not loaded, the process operation is returned to the step 505. At this step 505, a total value of time period lengths is again calculated by the control apparatus 4. Subsequently, the above-described operation is carried out.

As previously stated, in the case that the process operation is advanced to a step 519 when the correction is not required, such a deletion subject time period which is not set to the deletion time period before definition is detected by the control apparatus 4. Also, when it is judged that the deletion subject time period is present, the process operation is advanced to a step 520 at which the deletion subject time period is defined as the deletion time period. Then, the process operation is advanced to the next step 521. When it is so judged that there is no deletion subject time period, the process operation is directly advanced to a step 521.

With the above-described process operation, all of the deletion subject time periods are defined as the deletion time period, and the total time period length of all of these deletion time periods becomes a predetermined length. As previously described, the operator need not perform the work except for the simple operation, for instance, the instructing operation defined at the step 511, but can effectively execute the role editing work.

In the sequential operation defined in the flow chart shown in FIGS. 7A and 7B, the time period length of the deletion subject time period related to the first time period is corrected, or this time period is released, so that the time period length is made coincident with a predetermined length. However, in this flow chart, no consideration is made such that the deletion time period is provided outside the first time period, or in another time period other than the first time period. As a consequence, a sequential operation considering this item will now be explained with reference to a flow chart shown in FIGS. 8A and 8B.

Figure 8A:
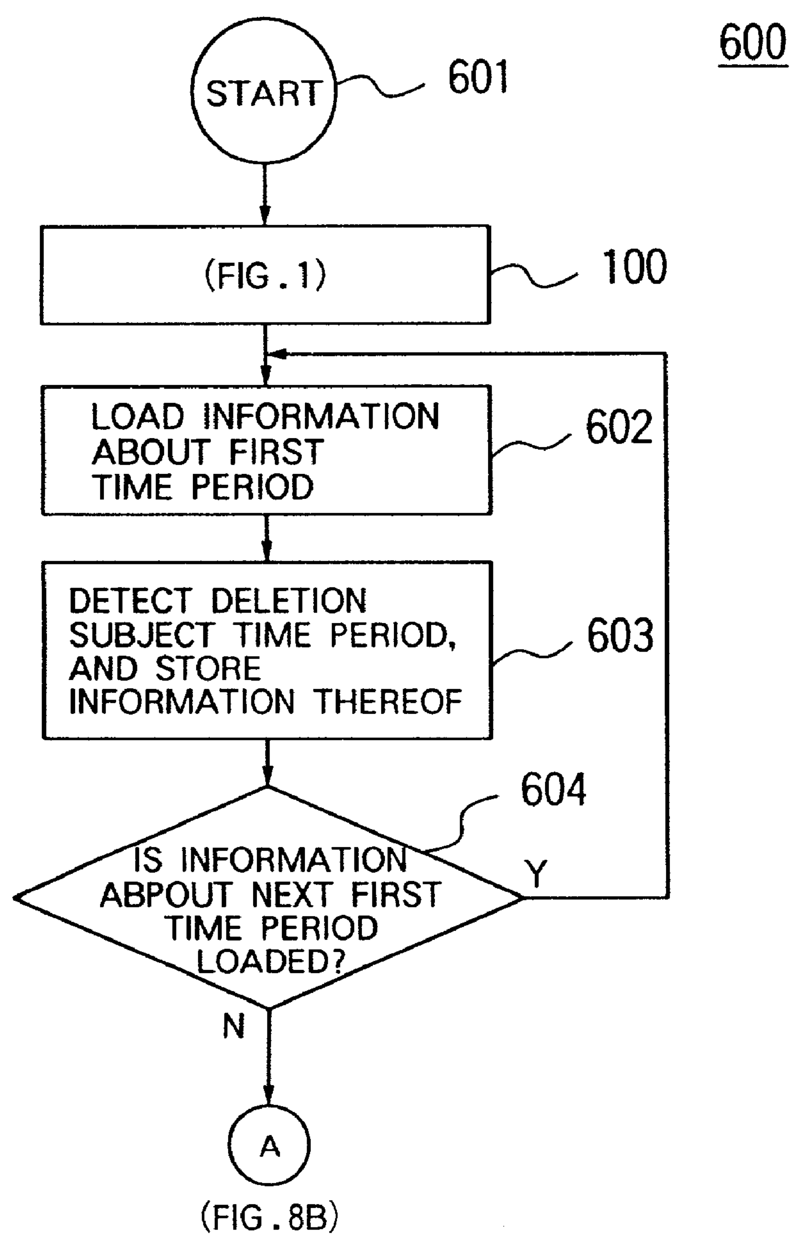

In the flow chart of FIGS. 8A and 8B, process operations defined from a step 601 to a step 621 except for the two steps 612 and 618 are carried out in a similar manner to those defined from the step 501 to the step 521 of FIGS. 7A and 7B. As a consequence, the explanations of the steps except to the step 612 and the step 618 are omitted.

The process operation is advanced from the steps 607, 611, 618 to the step 612. At this step 612, similar to the step 512 of FIG. 7, information related to a deletion subject time period which should be corrected, is loaded on the control apparatus 4.

Furthermore, information related to a deletion time period is loaded thereon. In addition, a new OUT point and a new IN point in an arbitrary time instant other than the first time period are set, and also information related to a time period between these newly set OUT point and IN point (namely, deletion time period other than first time period) is loaded on the control apparatus 4, and then the step 618 follows.

Next, the process operation is advanced from either the step 616 or the step 617 to the step 618. At the step 618, similar to the step 518 of FIG. 7, the control apparatus 4 judges as to whether or not the next deletion subject time period is loaded, and also judges as to whether or not the next deletion time period is present. Then, when it is so judged that the next deletion subject time period, or the next deletion time period is present, the process operation is advanced to the step 612. Conversely, when it is judged that neither the next deletion subject time period, nor the next deletion time period is present, the process operation is advanced to the step 605.

With employment of the above-described sequential operations, in the flow chart of FIGS. 7A and 7B, the deletion subject time period within the first time period can be deleted, or can be defined. In the flow chart of FIG. 8, the time period subject is extended, so that the deletion time period can also be released, or defined (containing "redefinition"). Furthermore, the deletion time period or the deletion subject time period other than the first time period can be released, or defined.

Figure 9:
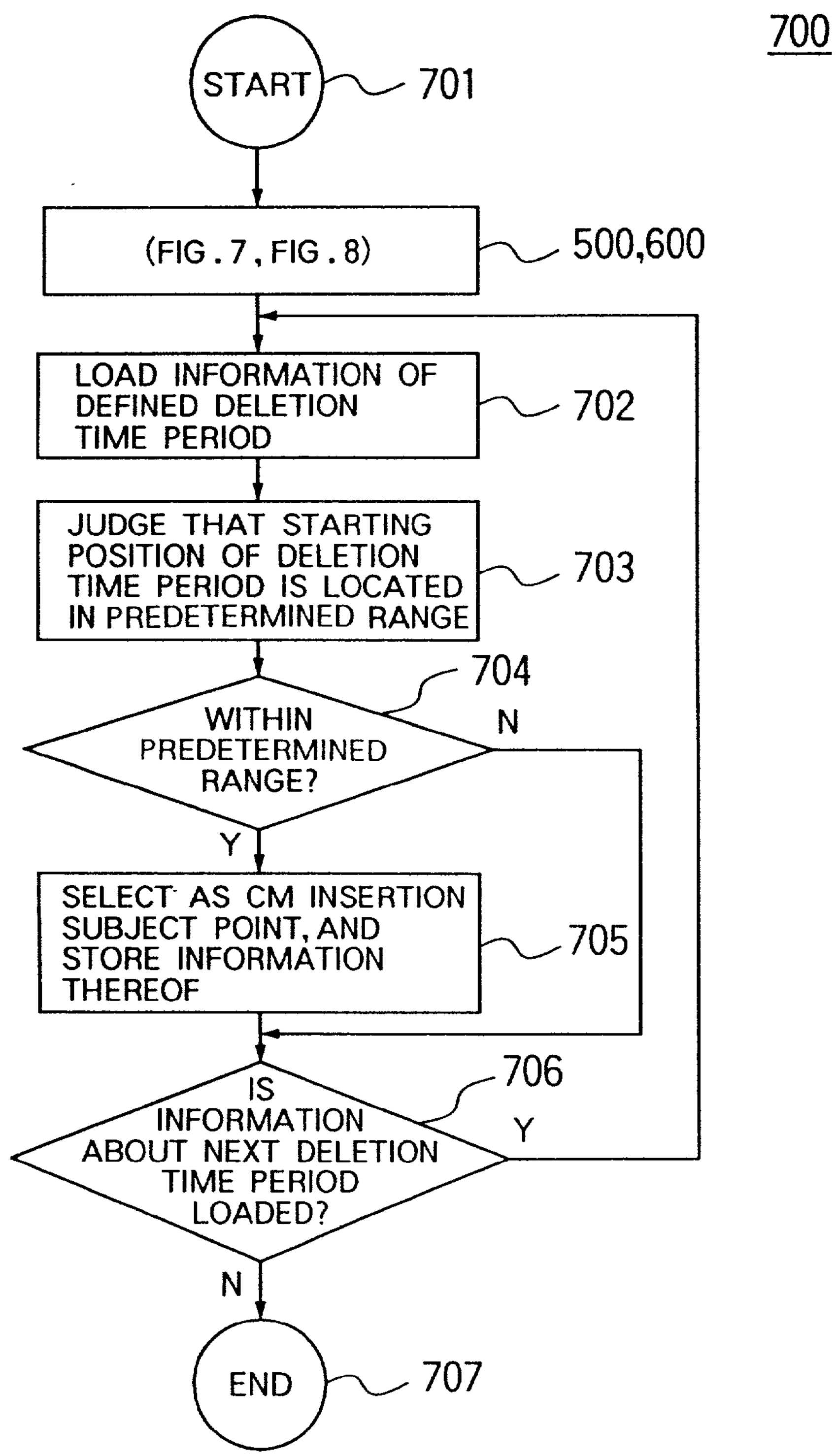
FIG. 9 is a flow chart for describing a sequential operation of a picture editing method according to an embodiment of the present invention.
Figure 10:
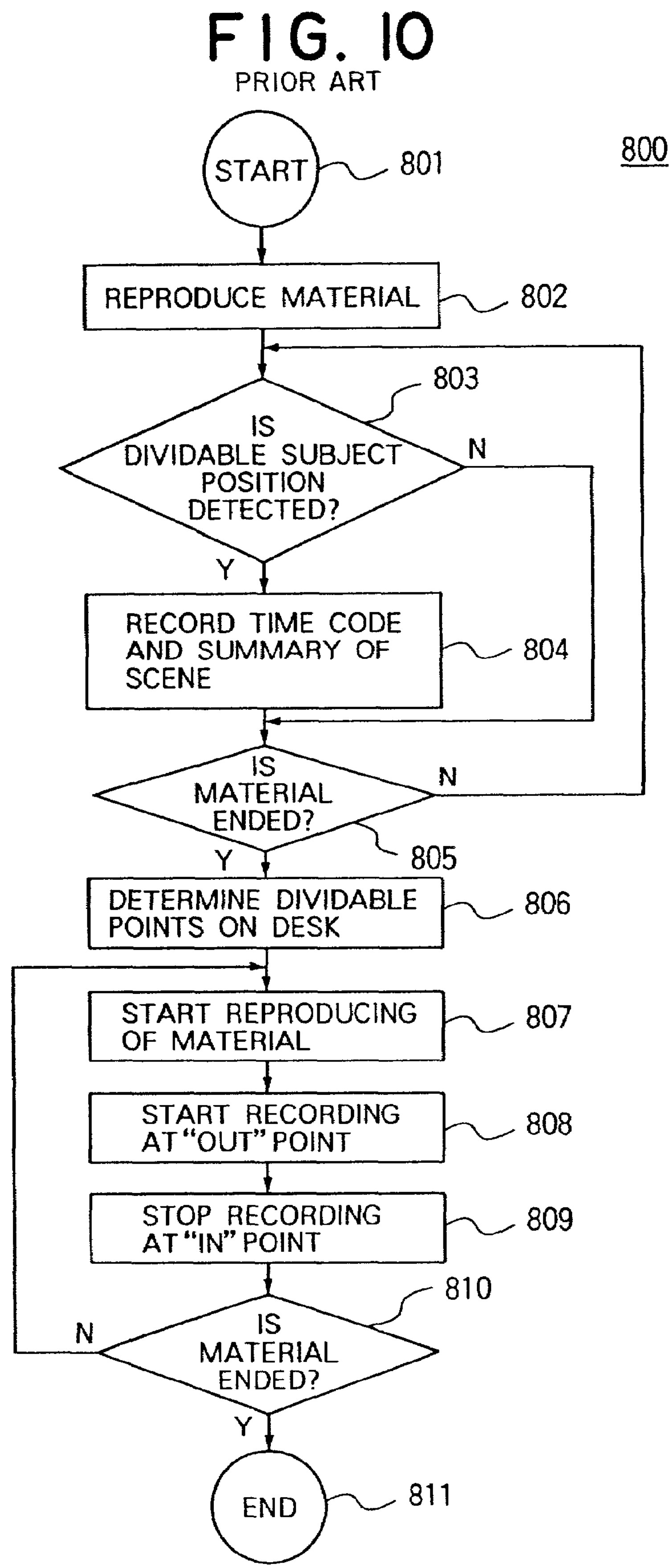
FIG. 10 is a flow chart for explaining the sequential operation of the Conventional picture editing method.

Subsequently, referring now to a flow chart shown in FIG. 9, a description will be made of a sequential operation for selecting a CM insertion subject point from the deletion time period obtained by the sequential operations defined in the flow charts of FIGS. 7A and 7B and FIGS. 8A and 8B. It should be understood that a structure of the flow chart indicated in FIG. 9 is identical to that of the flow chart shown in FIG. 5, and there is a difference in the content of the operation as to a portion of the steps for constituting the flow chart.

At a first step 702, for instance, when the information related to the deletion time period detected in the sequential operation (step 500 or step 600) shown in FIG. 7 or FIG. 8 is stored in the storage apparatus 5, the control apparatus 4 loads this information thereon from this storage apparatus 5. It should be noted that when this information is saved in the control apparatus 5, this information loading operation is not required.

Next, at a step 703, based on the information related to the deletion time period such as the time code signal, the control apparatus 4 confirms as to whether or not any one of the starting positions (positions of OUT points) is present within a redetermined range of the broadcasting program material used to insert, as previously explained in the prior art, the pre-CM, the intermediate CM1, the intermediate CM2, and the post-CM.

At the next step 704, when the control apparatus 4 judges that the position of the subject point confirmed at the step 703 is located in the above-explained predetermined range, the process operation is advanced to a step 705. Conversely, when the control apparatus 7 judges that the position of the subject point is located in this predetermined range, the process operation is advanced to a step 706.

At a step 705, the control apparatus 4 selects this dividable subject point as the CM insertion subject point based on such a fact that the confirmed subject point is located in this predetermined range. The information related to this CM insertion subject point, for instance, the time code signal, is outputted to the storage apparatus 5, and then the storage apparatus 5 stores therein this information. Then, the process operation is advanced to the next step 706.

At the step 706, the control apparatus 4 judges as to whether or not all of the dividable subject points have already been loaded so as to confirm whether or not it is the CM insertion subject point. When all of the dividable subject points have already been loaded, the process operation is advanced to a step 707. Conversely, when all of the dividable subject points have already been loaded, the process operation is returned to the step 702 in order to load another dividable subject point which is not yet confirmed.

As previously explained, the CM insertion subject point is selected, so that the works by the operator can be made simple and the work efficiency is increased without retrieving the CM insertion subject point by the operator.

In accordance with the present invention, the dividable subject point for executing the role editing operation is automatically detected from, for example, the time period of the silent portion of the picture information, so that the time required for the work for searching the dividable point subject position by the operator, and also the work for recording the information about the dividable point subject position by the operator can be greatly shortened, and thus the work efficiency can be considerably increased. Also, the dividable point subject position for the role editing operation is displayed on the screen of the display apparatus. Moreover, the sound (audio) waveform at the dividable subject point and also the still image of the dividable point are displayed in combination with the above-explained dividable subject position. As a consequence, the operator can simply determine the deletion subject time period and the CM insertion subject point while merely observing the information required to determine these deletion subject time period and CM insertion subject point via the display screen. Also, since the length of each role is automatically adjusted in connection with the broadcasting program material, the position of the subject which is used as the role dividing point is automatically selected/adjusted. Accordingly, the role dividing point can be more fastly determined.

As apparent from the foregoing descriptions, the work time and the efficiency, defined by such that the program material is role-edited to thereby produce the broadcasting program material can be improved.

Figure 4:
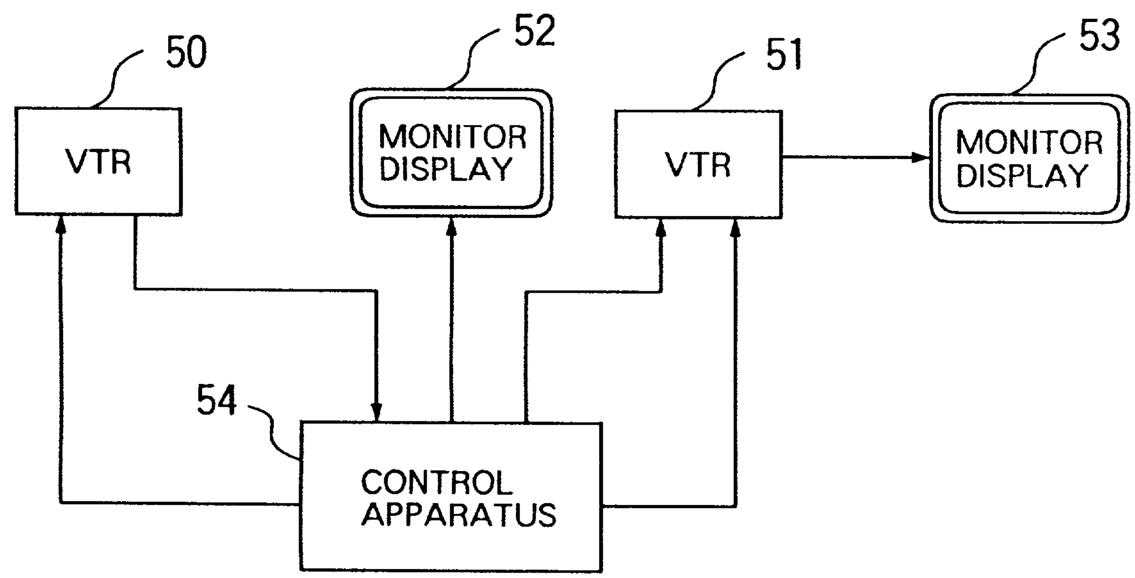
FIG. 4 is the schematic block diagram for showing the conventional picture editing apparatus.

It should be noted that the method for editing the recorded information according to the present invention may be executed by using the editing apparatus shown in FIG. 4. Alternatively, the present invention may be applied to an editing process other than the editing process by inserting the CM information. While the editing method of the present invention is utilized, such a picture monitoring apparatus may be realized in which a state of a specific audio (sound) signal is detected based on a feature of the audio signal, and a detected position is displayed.

What is claimed is:

1. A method of editing video information including a video signal and an audio signal recorded on a recording medium, comprising the steps of:

reproducing said recorded video information;

detecting positions where said audio signal having an amplitude smaller than a predetermined level exists for a time period longer than or equal to a predetermined time period while said video signal is displayed;

displaying said video signal and said audio signal on a display at the same time;

indicating on said video information discrimination information showing a plurality of editing positions of said video signal corresponding to the detected positions of said audio signal in order to insert a commercial message into a time period defined by said discrimination information;

confirming whether said discrimination information of said editing positions is a proper editing position in order to insert said commercial message;

selecting said proper editing position from said editing positions corresponding to said detected positions where said commercial message is inserted;

inserting said commercial message into the selected editing position;

adjusting said discrimination information so that a total time period of said video information and said commercial message becomes within a predetermined time for broadcasting; and storing said discrimination information in a memory so that said video information is combined with said commercial message based on said discrimination information, when said video information combined with said commercial message is broadcast.

2. A method as claimed in claim 1, further comprising a step of indicating on said display video images of said video information and waveforms of said audio signal corresponding to said discrimination information before and after said editing positions.

3. A method as claimed in claim 2, further comprising the steps of:

determining a period when a predetermined portion of said video information is to be recognized as a deletion period based on said discriminating information; and indicating as said deletion period the predetermined portion of said video information corresponding to said period determined in said determining step.

4. A method as claimed in claim 3, further comprising a step of inserting said commercial message into said deletion period in such a manner that a length of said video information becomes a predetermined time length.

5. A method as claimed in claim 2, further comprising a step of changing the position of said discrimination information in said video information.

6. A method as claimed in claim 3, further comprising a step of adjusting a time period corresponding to the predetermined portion of said video information as the deletion period of the video information in such a manner that a total time period of said video information becomes a predetermined time.

7. A method as claimed in claim 3, further comprising a step of adjusting a time period corresponding to the predetermined portion of said video information as the deletion period of said video information in such a manner that a total time period of said video information, when a position of said discrimination information in said video information is changed, becomes a predetermined time.

8. A method as claimed in claim 1, further comprising step of designating one of said editing positions, when there are a plurality of said editing positions, to determine said editing positions.

9. A storage medium for storing program codes to be read and executed by a computer, comprising:

a first section which detects positions where an audio signal having an amplitude smaller than a predetermined level exists for a time period longer than or equal to predetermined time period while said video signal is displayed;

a second section which displays video information including a video signal and said audio signal on a display at the same time;

a third section which indicates on said video information discrimination information showing editing positions of said video signal corresponding to the detected positions of said audio signal in order to insert a commercial message into a time period defined by said discrimination information;

a fourth section which confirms whether said discrimination information of said editing positions is proper editing position in order to insert said commercial message;

a fifth section which selects said proper editing position from said editing positions corresponding to said detected positions where said commercial message is inserted;

a sixth section which inserts said commercial message into the selected editing position;

a seventh section which adjusts said discrimination information so that a total time period of said video signal and said commercial message becomes within a predetermined time for broadcasting; and an eighth section which stores said discrimination information in a memory so that said video information is combined with said commercial message based on said discrimination information, when said video information combined with said commercial message is broadcast.

10. A storage medium as claimed in claim 9, wherein said third section has further section which displays video images of said video information and waveforms of said audio signal corresponding to said discrimination information before and after said editing positions.

11. A storage medium as claimed in claim 10, wherein said program codes further comprises:

a ninth section which determines a period where a predetermined portion of said video information is to be recognized as a deletion period based on said discrimination information, indicates as a deletion period the predetermined portion of said video information corresponding to said determined period, and inserts said commercial message into said deletion period in such a manner that the length of said video information becomes a predetermined time length.

12. A storage medium as claimed in claim 11, wherein said program codes further comprises:

a tenth section which adjusts a time period corresponding to the deletion period which corresponds to said predetermined portion of said video information in such a manner that a total time period of said video information becomes a predetermined time, when a position of said discrimination information in said video information is changed.

13. A method of editing video information of a broadcast program including a video signal and an audio signal recorded on a recording medium, said method comprising:

reproducing said recorded video information;

detecting positions where said audio signal having an amplitude smaller than a predetermined level exists for a time period longer than or equal to a predetermined time period while said video signal is displayed;

displaying said video signal and said audio signal on a display at the same time;

indicating discrimination information on said video information of said broadcast program, said discrimination information showing candidates of editing portions of said video information corresponding to the detected positions of said audio signal in order to insert a commercial message within a time period defined by said discrimination information;

confirming whether said discrimination information of said editing positions is proper editing position in order to insert said commercial message;

selecting said proper editing position from said candidates of editing portions;

editing said proper editing portion, and adjusting said discrimination information such that a total time period of said broadcast program becomes within a predetermined time; and storing said discrimination information in a memory so that the time period of said video signal is adjusted based on said adjusted discrimination information when the broadcast program is broadcast.

14. A method according to claim 13, wherein said adjusted discrimination information includes information representing start and end points of the editing portion in the video signal, and in said step of editing said proper editing portions, a portion of the video information which is not broadcast is determined, and said commercial message is inserted instead of the determined portion of video information when the broadcast program is broadcast so that the total time period of said broadcast program becomes within said predetermined time.

15. A method according to claim 13, wherein said adjusted discrimination information includes information representing start and end points of the editing portion in the video signal, and in said step of editing said proper editing portions, a portion of the video information which is not broadcast is determined, and a repetition portion in the selected editing portion repeated in the broadcast program is determined, such that the total time of said broadcast program becomes within said predetermined time when the broadcast program is broadcast.

* * * * *